US009611916B2

United States Patent
Shimada

(10) Patent No.: US 9,611,916 B2
(45) Date of Patent: Apr. 4, 2017

(54) TORQUE ROD

(71) Applicant: YAMASHITA RUBBER KABUSHIKI KAISHA, Fujimono-shi, Saitama (JP)

(72) Inventor: Hitoshi Shimada, Fujimino (JP)

(73) Assignee: YAMASHITA RUBBER KABUSHIKI KAISHA, Fujimino-Shi (JP)

( * ) Notice: Subject to any disclaimer, the term of this patent is extended or adjusted under 35 U.S.C. 154(b) by 0 days.

(21) Appl. No.: 14/646,060

(22) PCT Filed: Nov. 26, 2013

(86) PCT No.: PCT/JP2013/081749
§ 371 (c)(1),
(2) Date: May 20, 2015

(87) PCT Pub. No.: WO2014/084202
PCT Pub. Date: Jun. 5, 2014

(65) Prior Publication Data
US 2015/0300446 A1    Oct. 22, 2015

(30) Foreign Application Priority Data
Nov. 27, 2012  (JP) .................................. 2012-258502

(51) Int. Cl.
*F16F 15/00*     (2006.01)
*F16F 15/08*     (2006.01)
(Continued)

(52) U.S. Cl.
CPC .......... *F16F 15/085* (2013.01); *B60K 5/1208* (2013.01); *B60K 5/1241* (2013.01);
(Continued)

(58) Field of Classification Search
CPC .... F16F 3/10; F16F 3/12; F16F 15/085; F16F 2238/024; F16F 2236/12; B60K 5/1208; B60K 5/1241
See application file for complete search history.

(56) References Cited

U.S. PATENT DOCUMENTS

| | | | | |
|---|---|---|---|---|
| 5,887,859 A | * | 3/1999 | Hadano | F16F 1/3863 267/141.1 |
| 2003/0107163 A1 | * | 6/2003 | Asano | F16F 1/3873 267/140.12 |

(Continued)

FOREIGN PATENT DOCUMENTS

| | | |
|---|---|---|
| JP | 6-109075 | 4/1994 |
| JP | 2000-065113 | 3/2000 |

(Continued)

*Primary Examiner* — Thomas J Williams
*Assistant Examiner* — James Hsiao
(74) *Attorney, Agent, or Firm* — Rankin, Hill & Clark LLP

(57) ABSTRACT

A second inner member and a second insulator are provided in a second ring-shaped member forming a torque rod. A first bore section and a second bore section are provided in front of and in the rear of the second inner member. The insulator has an elastic arm section extending in the direction of a Y axis. A spring adjustment recess extends in a slit shape in the direction of an X axis from an end of the first bore section. The spring adjustment recess forms an unrestricted part of the elastic arm section by the second ring-shaped member, whereby the Z spring in the axial direction of the inner member is lowered, and the XZ spring ratio can be changed greatly while maintaining the size of the X spring in the main vibration inputting direction.

11 Claims, 13 Drawing Sheets

(51) Int. Cl.
 *F16F 1/38* (2006.01)
 *F16F 1/387* (2006.01)
 *B60K 5/12* (2006.01)
 *F16F 3/10* (2006.01)

(52) U.S. Cl.
 CPC .......... *F16F 1/3849* (2013.01); *F16F 1/3873* (2013.01); *F16F 3/10* (2013.01); *F16F 2236/12* (2013.01); *F16F 2238/024* (2013.01)

(56) References Cited

U.S. PATENT DOCUMENTS

| | | | | |
|---|---|---|---|---|
| 2003/0214085 | A1* | 11/2003 | Makino | F16F 1/3849 267/140.12 |
| 2005/0254888 | A1* | 11/2005 | Oji | F16F 1/3849 403/187 |
| 2007/0272051 | A1* | 11/2007 | Kamei | B60G 7/001 74/579 R |
| 2008/0315473 | A1* | 12/2008 | Nishimae | F16F 1/3849 267/140.11 |
| 2009/0174126 | A1* | 7/2009 | Takeshima | B60K 5/1208 267/140.4 |
| 2013/0328254 | A1* | 12/2013 | Kojima | B60K 5/1241 267/140.15 |
| 2014/0151946 | A1* | 6/2014 | Yokawa | F16F 1/3849 267/292 |

FOREIGN PATENT DOCUMENTS

| | | |
|---|---|---|
| JP | 2012-189142 | 10/2012 |
| JP | 2012-251642 | 12/2012 |

\* cited by examiner

TORQUE ROD

TECHNICAL FIELD

The present invention relates to a torque rod which is used for supporting an engine of a vehicle on a vehicle body in a vibration isolating manner.

BACKGROUND ART

The torque rod is publicly known as an example of a vibration isolating device for supporting the engine of the vehicle on the vehicle body in the vibration isolating manner. This torque rod includes a cylindrical rod main body and vibration isolating connecting sections provided on each end of the rod main body and having bushings. The vibration isolating connecting sections are mounted on the engine and the vehicle body, respectively.

The vibration isolating connecting section has an inner member to be mounted on the engine or vehicle body, a ring-shaped member integrally formed with the rod main body, and an insulator of elastic vibration isolating material such as rubber or the like providing a connection between the ring-shaped member and the inner member. The inner member is mounted on the vehicle body side by means of a vehicle body attachment shaft such as a bolt or the like.

With respect to the vibration isolating connecting section of the pair of vibration isolating connecting sections to be mounted on the vehicle body side, the insulator is provided with an elastic arm portion which extends from the inner member to both sides relative to the main vibration inputting direction. Extending ends of the elastic arm portion are restricted by the ring-shaped member, and the spring of the elastic arm section is different in the orthogonal three-axis directions of the inner member.

Hereinafter, with respect to the orthogonal three-axis directions, a center axis direction of the inner member shall be referred to as a Z axis, a main vibration inputting direction orthogonal to the Z axis shall be referred to as an X axis, and a direction orthogonal to each of the X axis and the Z axis shall be referred to as a Y axis. In addition, with respect to the spring of the elastic arm portion of the vibration isolating connecting section to be connected to the vehicle body side, the spring in the Z direction (the direction parallel to the Z axis shall be referred to as a Z spring, the spring in the X direction (the direction parallel to the X axis) shall be referred to as an X spring, and the spring in the Y direction (the direction parallel to the Y axis) shall be referred to as a Y spring.

PRIOR ART REFERENCE

Patent reference 1: Japanese Patent Application Laid-open Publication JP H06-109075 A.

DISCLOSURE OF THE INVENTION

Problem to be Solved by the Invention

The torque rod has an isolation performance of the vibration transmission from the engine to the vehicle body side as a function thereof. However, this vibration isolation performance varies in accordance with the relative relationship between a rigid body resonance frequency range of the torque rod and a resonance frequency range of the vehicle body side. This will be explained with reference to FIG. 6. FIG. 6 is a graph indicating vibration transmission charac-teristics of the torque rod, in which a vertical axis is the vibration transmission performance and a horizontal axis is the rigid body resonance frequency of the torque rod. In this graph, two vibration transmission characteristics before frequency movement and after frequency movement are indicated with respect to the vibration transmission characteristics of the torque rod. These two characteristic curves are of substantially a chevron shape similar to each other. The frequencies F0, F1 at the peaks P0, P1 of the characteristic curves indicate peak frequencies of the rigid body resonance, respectively.

With respect to the characteristic curve of the vibration isolation characteristic before the frequency movement, such special measures for decreasing the resonance frequency as seen in the present invention to be referred to later are not taken, and the peak P1 occurs at a relatively high resonance frequency F1. On the other hand, the peak P0 in the characteristic curve after the frequency movement in the case where the special measures to decrease the resonance frequency are taken occurs at a low resonance frequency F0.

Herein, although, in the characteristic curve before the frequency movement, the vibration transmission performance at a highly sensitive frequency FQ on the vehicle body side is Q1, the level of this vibration transmission performance Q1 is high in the vibration transmission performance under the influence of the rigid body resonance of the torque rod, and the vibration of the engine is relatively easily transmitted to the vehicle body side, so that the isolation of the vibration is not performed sufficiently.

Therefore, if, at the highly sensitive frequency FQ on the vehicle body side, the vibration transmission performance is decreased up to Q0 that is enough to isolate the vibration, the vibration isolation effect $\Delta Q(=Q1-Q0)$ is created, so that the vibration transmission to the vehicle body side can be prevented.

Moreover, such vibration isolation is able to be achieved when the characteristic curve is shifted in parallel from the peak P1 to the peak P0 so as to provide the characteristic curve after the frequency movement. This shift of the peaks is nothing other than what the rigid body resonance frequency of the torque rod is moved from F1 to F0. Accordingly, if the rigid body resonance frequency of the torque rod is decreased in such a way as to be offset from the highly sensitive frequency FQ on the vehicle body side, the necessary vibration isolation effect is able to be created. Therefore, it is required to make such rigid resonance frequency controllable.

By the way, in the vibration system comprised of the spring and the weight, the frequency of the rigid body resonance is in proportion to a square root of the spring and in inverse proportion to a square root of the weight. Accordingly, it is known that, when the spring is decreased or when the weight is increased, the frequency of the rigid body resonance can be decreased.

However, since, due to the basic requirement in design terms to reduce the weight of the vehicle, the weight reduction of the torque rod also is as much desired as possible, the adjustment of the frequency of the rigid body resonance by the increase in weight is not able to be adopted. Therefore, another requirement is that the frequency of the rigid body resonance is adjustable while reducing the weight of the torque rod.

Further, in the case of adjusting the spring, it is required that spring ratios of the springs in the X, Y and Z directions come within the predetermined range.

Particularly, not to decrease the X spring functioning as a vibration isolating main body is required. Then, it is desired that the spring adjustment is carried out in such a manner as to adjust each of the spring ratios of the Y spring and Z spring to the X spring while keeping the X spring within the predetermined range.

It is therefore an object of the present invention to meet the above requirements.

Means for Solving the Problem

To solve the above described problems, a torque rod according to a first feature of the present invention comprises a rod main body (10) of a long member, a small round section (11a) and a large round section (11b) which form a pair of vibration isolating connecting sections different in size, being provided in each end in the longitudinal direction of the rod main body (10), at least the large round section (11b) of the vibration isolating connecting sections including a ring-shaped member (14) provided in the rod main body (10), an inner member (20) arranged in a center portion of the ring-shaped member (14), and an insulator (22) of an elastic body elastically connecting the inner member (20) and the ring-shaped member (14), wherein, when a center axis of the inner member (20) is a Z axis, a main vibration inputting axis orthogonal to the Z axis is an X axis, and an axis orthogonal to these Z axis and X axis is a Y axis, the insulator (22) is provided with a spring adjustment recess (32) so as to control a frequency of rigid body resonance in the direction of the Z axis at least by changing a spring ratio of a spring in the direction of the X axis to a spring in the direction of the Z axis.

According to a second feature of the present invention, in the torque rod as defined in the first feature, the spring adjustment recess (32) is formed of a groove, wherein, when adjusting a depth and width of the groove, the spring ratios of the springs in the directions of the X axis, the Y axis and the Z axis are adjustable.

According to a third feature of the present invention, in the torque rod as defined in the first or second feature, the insulator (22) extends from the inner member (20) to both sides of the X axis and includes an elastic arm section (30) each extending end of which is joined to and restricted by the ring-shaped member (14), and the spring adjustment recess (32) is provided in a part of a joint portion of the elastic arm section (30) relative to the ring-shaped member (14) so as not to be restricted by the ring-shaped member (14).

According to a fourth feature of the present invention, in the torque rod as defined in any one of the first to third features, the spring adjustment recess (32) is located in an outward position in the direction of the Y axis in relation to a spring region (38) of the elastic arm section (30) functioning as a main body of spring action when a main vibration has been inputted.

According to a fifth feature of the present invention, in the torque rod as defined in any one of the first to fourth features, the insulator (22) includes a first bore section (24) and a second bore section (26) which are located in either side of the inner member (20) in the direction of the X axis, wherein the first bore section (24) and the second bore section (26) pass through the insulator (22) in the direction of the Z axis and extend on either side of the X axis across the elastic arm section (30), and the spring adjustment recess (32) is formed in such a way as to extend from the first bore section (24) or the second bore section (26) in the direction of the X axis.

According to a sixth feature of the present invention, in the torque rod as defined in any one of the first to fifth features, when a tangential line of the inner member (20) in the direction of the X axis is L1 and a straight line extending in parallel with the tangential line and passing an end portion of the second bore section (26) is L2, a region (38) of the elastic arm section (30) located between the tangential line L1 and the straight line L2 is the spring region (38) functioning as the main body of the spring action at the time of having inputted the main vibration, and the spring adjustment recess (32) is provided in the outward position of the region (38) in the direction of the Y axis.

According to a seventh feature of the present invention, in the torque rod as defined in any one of the first to sixth features, the spring adjustment recess (32) is formed in a slit shape.

According to an eighth feature of the present invention, in the torque rod as defined in any one of the first to seventh features, the rod main body (10) and the ring-shaped member (14) are integrally formed of non-metal having a specific gravity of 2.7 or less.

Effects of the Invention

According to the first feature of the present invention, since the spring adjustment recess (32) is provided in the insulator (22) of the large round section (11b), at least the spring ratio of the spring (X spring) in the direction of the X axis to the spring (Z spring) in the Z axis is changed thereby making it possible to control the frequency of the rigid body resonance in the Z axis direction of the torque rod. At that time, when the frequency of the rigid body resonance is adjusted by the spring adjustment recess (32) in such a way as to be offset from the high sensitive frequency on the vehicle body side, the vibration isolating effect is created whereby the vibration transmission to the vehicle body side can be restricted.

According to the second feature of the present invention, the spring adjustment recess (32) is formed of the groove, and, when adjusting the depth and width of the groove, the spring ratios of the springs in the directions of the X axis, the Y axis and the Z axis are changed. Therefore, these spring ratios can be adjusted. Accordingly, it is possible not only to control the frequency of the rigid body resonance but also to adjust the spring ratios in each of the directions of the X, Y and Z axes.

According to the third feature of the present invention, since the spring adjustment recess (32) which is not restricted by the ring-shaped member (14) is provided in a part of the joint portion of the elastic arm section (30) relative to the ring-shaped member (14), the Z spring in the direction of the center axis of the inner member (20) can be decreased large while maintaining the X spring in the main vibration inputting direction at a predetermined degree.

Therefore, the Z spring is decreased without having an influence upon the X spring necessary for absorption of the main vibration, whereby the frequency of the rigid body resonance in the Z direction can be decreased. As a result, the vibration to the vehicle body side can be effectively isolated.

Further, since the adjustment of the Z spring is performed only by providing the spring adjustment recess (32) in a part of the elastic arm section (30) without increasing in weight, the frequency of the rigid body resonance can be decreased without increasing the weight of the torque rod.

In addition, since the XZ spring ratio is changed large and the XZ spring ratio which has not been realized in the past is realized, the control width of the XZ spring ratio is expanded whereby the degree of freedom in tuning can be improved.

According to the fourth feature of the present invention, since the spring adjustment recess (32) is located in an outward position in the direction of the Y axis in relation to a spring region (38) of the elastic arm section (30) functioning as a main body of spring action when a main vibration has been inputted, the influence upon the X spring can be limited even if the spring adjustment recess (32) is provided.

According to the fifth feature of the present invention, since the spring adjustment recess (32) is formed in such a way as to cut deep into the elastic arm section (30) from the first bore section (24) or the second bore section (26) in the direction of the X axis, an area which is not restricted by the ring-shaped section (14) can be easily formed in the elastic arm section (30).

According to the sixth feature of the present invention, when the tangential line of the inner member (20) in the direction of the X axis is L1 and the straight line extending in parallel with the tangential line and passing the end portion of the second bore section (26) is L2, the region (38) of the elastic arm section (30) located between the tangential line L1 and the straight line L2 is the spring region (38) functioning as the main body of the spring action at the time of having inputted the main vibration. Therefore, when the spring adjustment recess (32) is provided in the outward position of the region (38) in the direction of the Y axis, the influence upon the X spring can be limited even if the spring adjustment recess (32) is provided.

According to the seventh feature of the present invention, since the spring adjustment recess (32) is formed in a slit shape, it can be formed in a small size, whereby it can be easily formed. In addition, the influence upon the Y spring can be limited as much as possible.

According to the eighth feature of the present invention, since the rod main body (10) and the ring-shaped member (14) are integrally formed of resin, the torque rod can be reduced in weight. Moreover, although the weight is reduced, the frequency of the rigid body resonance in the Z direction can be decreased, whereby the weight reduction and the decrease in the frequency can be achieved simultaneously.

BEST MODE FOR CARRYING OUT THE INVENTION

Figure 1:
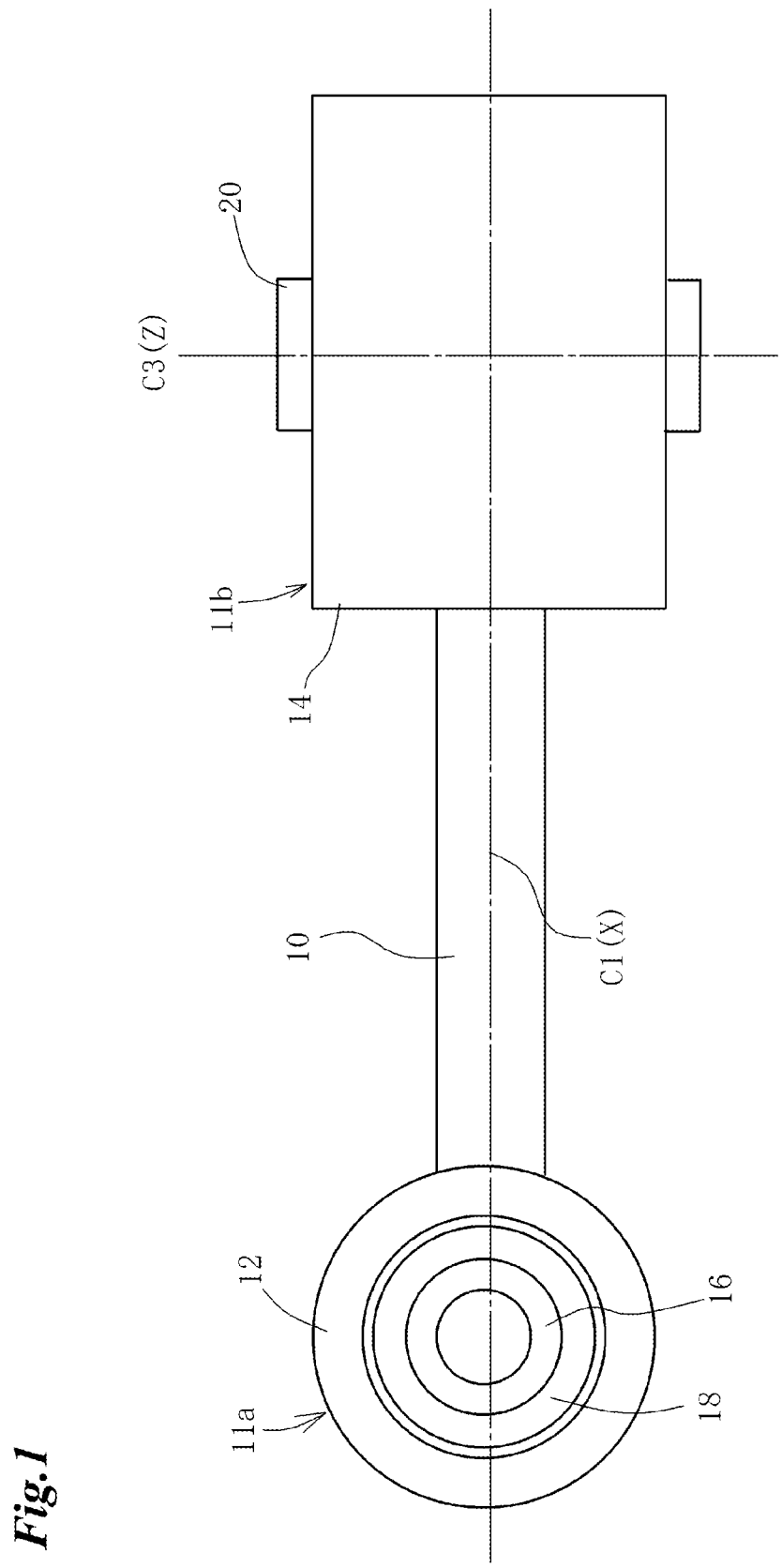
FIG. 1 is a front view of a torque rod in accordance with an embodiment of the present invention.
Figure 2:
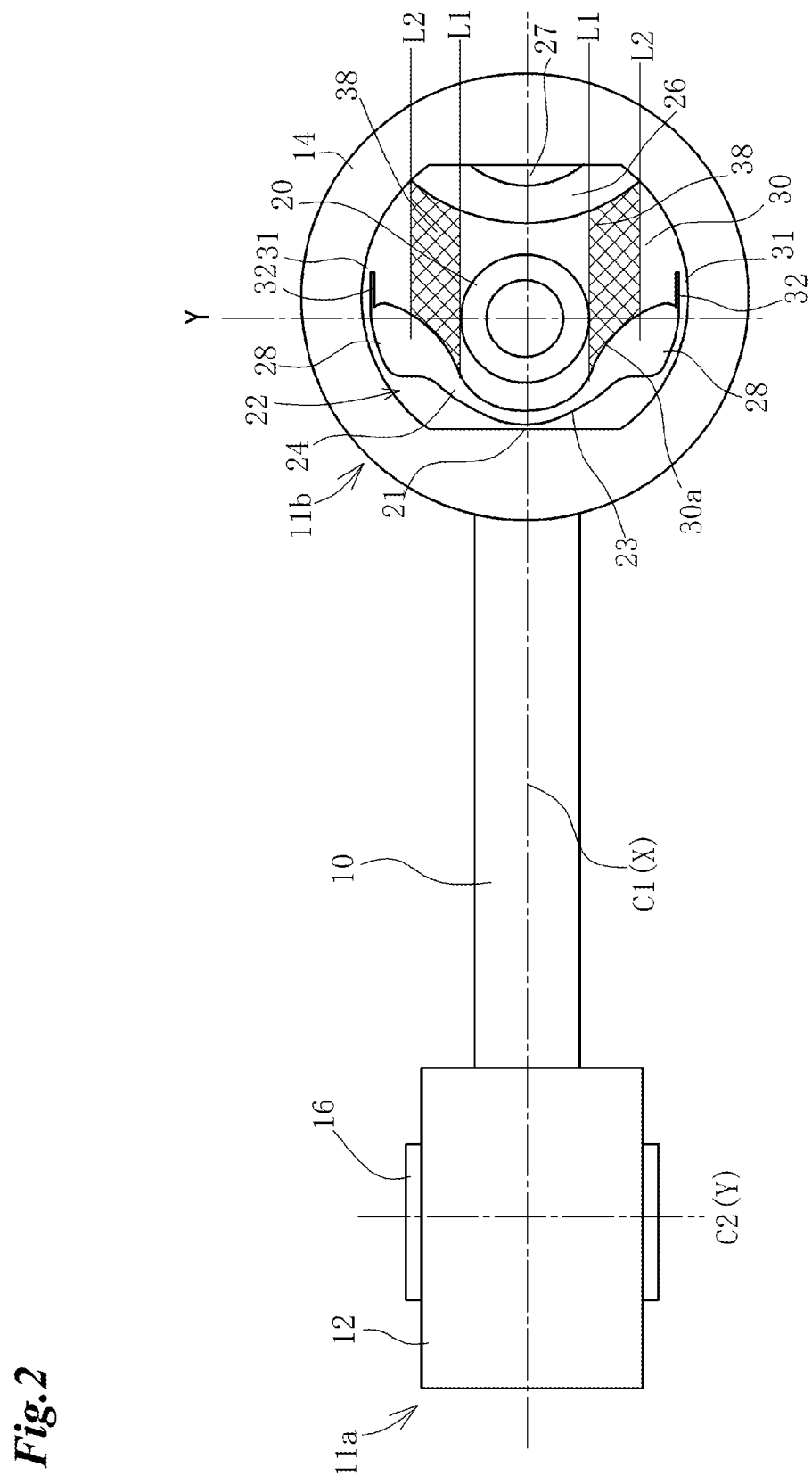
FIG. 2 is a plan view of the above torque rod.
Figure 3:
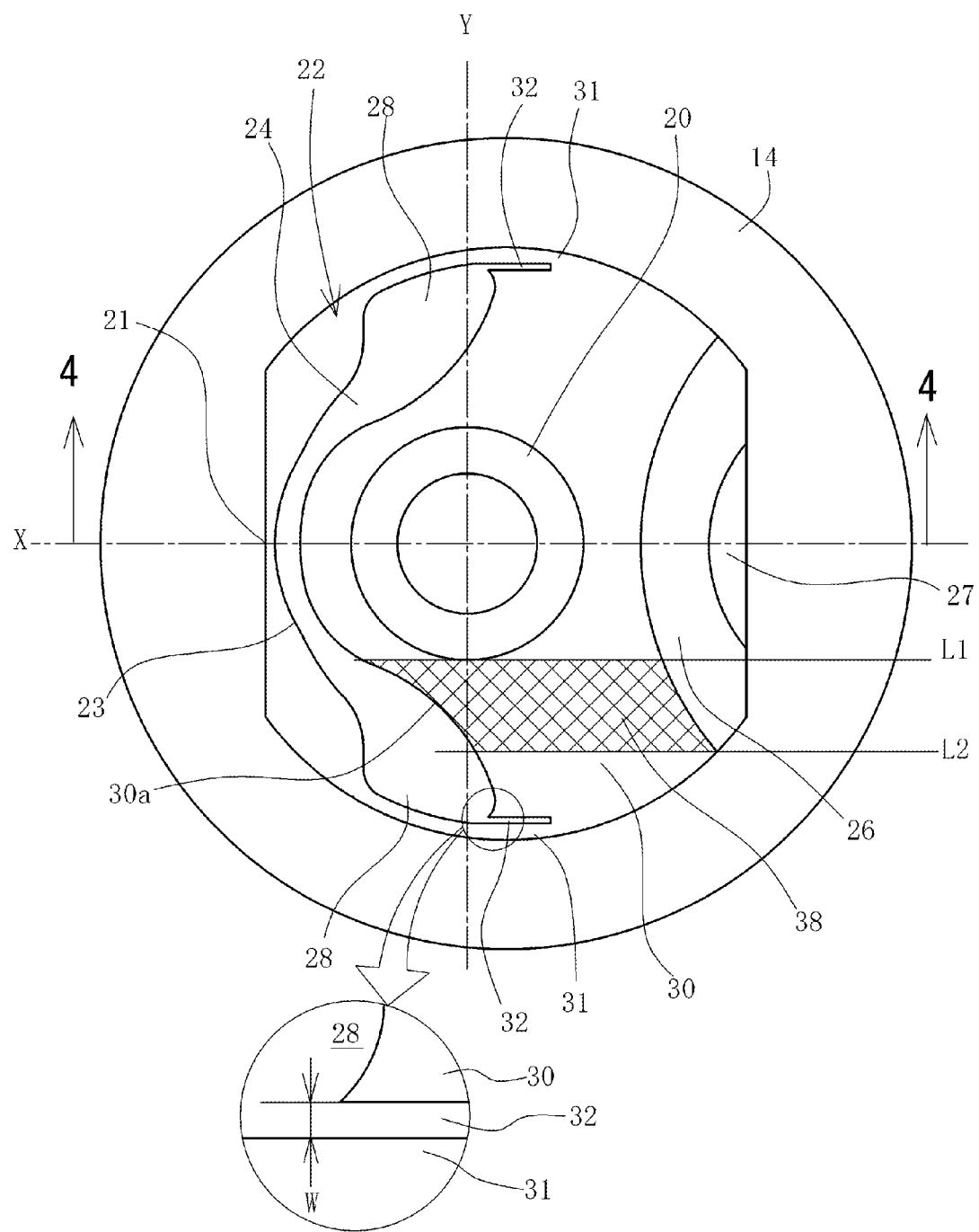
FIG. 3 is a plan view of one of a vibration isolating connecting sections.
Figure 4:
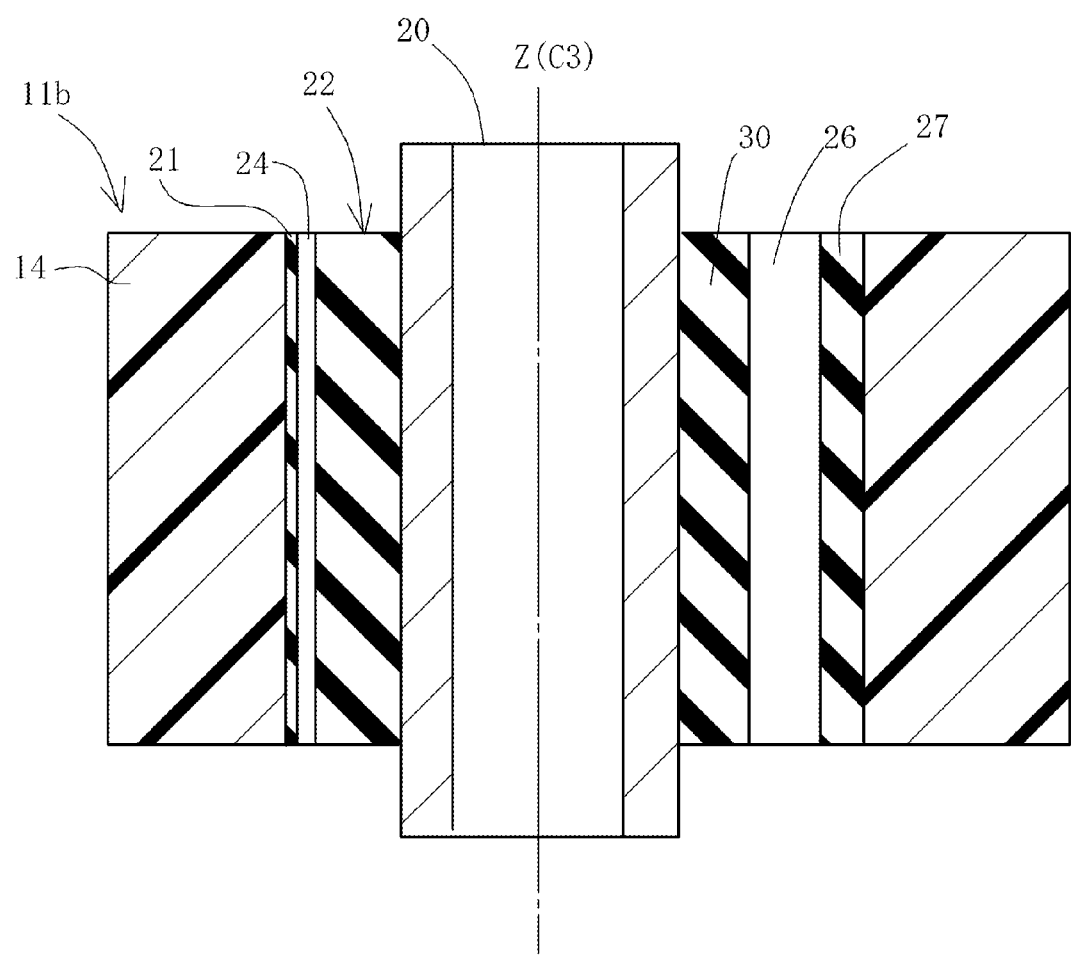
FIG. 4 is a cross sectional view taken on line 4-4 of FIG. 3.

Hereinafter, a torque rod provided for supporting an engine of a vehicle will be explained with reference to drawings. FIG. 1 is a front view of a torque rod. FIG. 2 is a plan view thereof. FIG. 3 is a plan view of a large round section. FIG. 4 is a cross sectional view taken on line 4-4 of FIG. 3;

This torque rod includes the rod main body 10 of a round bar shape, a small round section 11a and a large round section 11b comprised of a pair of vibration isolating connecting sections which are different in size and provided in each end in the longitudinal direction of the rod main body 10.

The small round section 11a of the pair of vibration isolating connecting sections includes a first ring-shaped member 12, a first inner member 16 arranged in a center portion of the first ring-shaped member 12, and a first insulator 18 made of a proper elastic member such as rubber or the like filled in between the first inner member 16 and the first ring-shaped member 12. The first ring-shaped member 12 and the first inner member 16 are elastically connected by the first insulator 18. For the elastic connection by the first insulator 18, various methods such as adhesion by vulcanization or the like, crimp by fit, etc. may be used. The first inner member 16 is mounted on the engine which is not shown in the drawing.

The large round section 11b of large size includes a second ring-shaped member 14, a second inner member 20 arranged in a center portion of the second ring-shaped member 14, and a second insulator 22 of a proper elastic member such as rubber or the like filled in between the second inner member 20 and the second ring-shaped member 14. The second ring-shaped member 14 and the second inner member 20 are elastically connected by the second insulator 22. For the elastic connection by the second insulator 22, various methods such as adhesion by vulcanization or the like, crimp by fit, etc. may be used. The second inner member 20 is of cylindrical shape and is mounted through a bolt member (not shown) on the vehicle body side which is not shown in the drawing.

The first ring-shaped member 12 and the second ring-shape member 14 are integrally formed by rigid material such as resin or the like together with the rod main body 10. Although the first ring-shape member 12 and the second ring-shaped member 14 are of cylindrical shape respectively, the second ring-shape member 14 is larger in diameter than the first ring-shaped member 12.

Herein, a center line connecting a center of the first inner member 16 and a center of the second inner member 20 shall be designated C1. The C1 in this embodiment is also a center line of the rod main body 10.

Moreover, a center axis of the first inner member 16 and a center axis of the second inner member 20 shall be designated C2 and C3, respectively. The center axes C2 and C3 are orthogonal to each other and also are orthogonal to the center line C1.

By the way, the center axes C2 and C3 may be configured to extend in parallel with each other.

In addition, in this embodiment, the center line C1 is arranged in such a way as to extend in the forward and backward direction (X axis direction) of the vehicle, the center axis C2 is arranged in such a way as to extend in the left and right direction (Y axis direction), and the center axis C3 is arranged in such a way as to extend in the upward and downward direction (Z axis direction). These X, Y and Z are orthogonal three axes which are orthogonal to one another at each of center portions of the first inner member 16 and the second inner member 20.

When the engine is supported through this torque rod on the vehicle body, the main vibration from the engine is inputted from the first inner member 16 to the small round section 11a of small diameter and passes through the rod main body 10 along the center line C1. Then, it is inputted to the large round section 11b of large diameter and transmitted from the second inner member 20 to the vehicle body.

Hereinafter, a detailed construction of the large round section 11b of large diameter will be explained. As shown in FIG. 3, in the second insulator 22 there are provided a first bore section 24 and a second bore section 26 in front of and in the rear of the second inner member 20. The first bore section 24 is provided in front of the inner member 20, namely on the side on which the second inner member 20 and the second ring-shaped member 14 come close to each other when the main vibration has been inputted. The second bore section 26 is provided in the rear of the inner member 20, namely on the side on which the second inner member 20 and the second ring-shaped member 14 move away from each other at the time of having inputted the main vibration. These bore sections 24 and 26 extend symmetrically in the left and right direction on either side of the X axis and are formed in such a way as to pass through in the direction of the Z axis.

The first bore section 24 is larger than the second bore section 26 and has a left and right ends each of which reaches the neighborhood of the second ring-shaped member 14, whereby to form an enlarged opening 28. A portion of an edge of the first bore section 24 which is located in front of the second inner member 20 and opposed to the second inner member 20 on the X axis is formed as a stopper 21 which comes into contact with the second inner member 20 when the second inner member 20 has moved forward relative to the second ring-shaped member 14, to thereby stop the forward movement of the second inner member 20.

The second bore section 26 has a relatively small amount of leftward and rightward extension and is formed in substantially an inverted V-shape. A portion on the X axis of a rear edge of the second bore section 26 is formed as a second stopper 27 which projects forward in substantially a chevron shape. When the second inner member 20 has moved backward relative to the second ring-shaped member 14, the second stopper 27 comes into contact through a front edge thereof with the second inner member 20 to thereby stop the backward movement of the second inner member 20.

A portion of the second insulator 22 located between the first bore section 24 and the second bore section 26 is formed as an elastic arm section 30 which extends to both sides in the Y direction across the second inner member 20. This elastic arm section 30 is a portion to form each spring in the X, Y and Z directions. When the springs in each of the X, Y and Z directions are an X spring, a Y spring and a Z spring, and spring values in each of the X, Y and Z directions are Ex, Ey and Ez, Ey>Ex>Ez.

In addition, an XZ spring ratio Ez/Ex which is a spring ratio of the X spring to the Z spring is configured to be about 0.36.

Both extending end portions of the elastic arm section 30 in the direction of the Y axis are united with the second ring-shaped member 14 and restricted by the second ring-shaped member 14. These extending end portions are joint portions 31 of the elastic arm section 30 joined to the second ring-shaped member 14. A spring adjustment recess 32 shown by hatching is formed in this joint portion 31. This spring adjustment recess 32 is provided for decreasing the Z spring in such a manner that a part of the extending end portion of the elastic arm section 30 is not restricted relative to the second ring-shaped member 14. The spring adjustment recess 32 is formed in such a way as to cut the front edge portion of the elastic arm section 30 facing the enlarged opening 28, backwardly in parallel with the X axis. In this embodiment, it is a gap of a slit shape. In other words, the spring adjustment recess 32 is a slit-shaped recess extending into the thickness of the elastic arm section 30 from the enlarged opening 28.

A front edge portion 23, exclusive of the first stopper 21, of the edge surrounding the first bore section 24 has a circular arc shape similar to the second ring-shaped member 14. A part intersecting the X axis is formed as the first stopper 21 of substantially a flat shape. In addition, a rear side of the edge surrounding the first bore section 24 forms a front edge portion 30a of the elastic arm section 30. The front edge portion 30a is of a curved shape, and both ends in the direction of the Y axis thereof are spaced apart from the front edge portion 23 so as to form the enlarged openings 28. The both ends in the direction of the Y axis of the front edge portion 30a extend toward the second ring-shaped member 14 so as to be connected to the spring adjustment recesses 32, and the connected portions to the spring adjustment recesses 32 are formed as acute bending portions 33.

Further, when a tangential line of the second inner member 20 in parallel with the X axis is L1 and a straight line extending in parallel with the tangential line and passing each end portion in the left and right direction of the second bore section 26 is L2, the spring adjustment recesses 32 are located in an outward position of the straight line L2 in the direction of the Y axis.

A region 38 of the elastic arm section 30 located between the tangential line L1 and the straight line L2 is a main region for forming the X spring when the main vibration has been inputted in the direction of the X axis.

Thus, since the spring adjustment recess 32 is offset from this region, the influence upon the X spring is decreased. By the way, a forward part of the joint portion 31 in which there is provided the spring adjustment recess 32 of the elastic arm section 30 is subjected primarily to the force in the tensile direction when the main vibration has been inputted, so that it does not exert much influence upon the size of the X spring.

Figure 5:
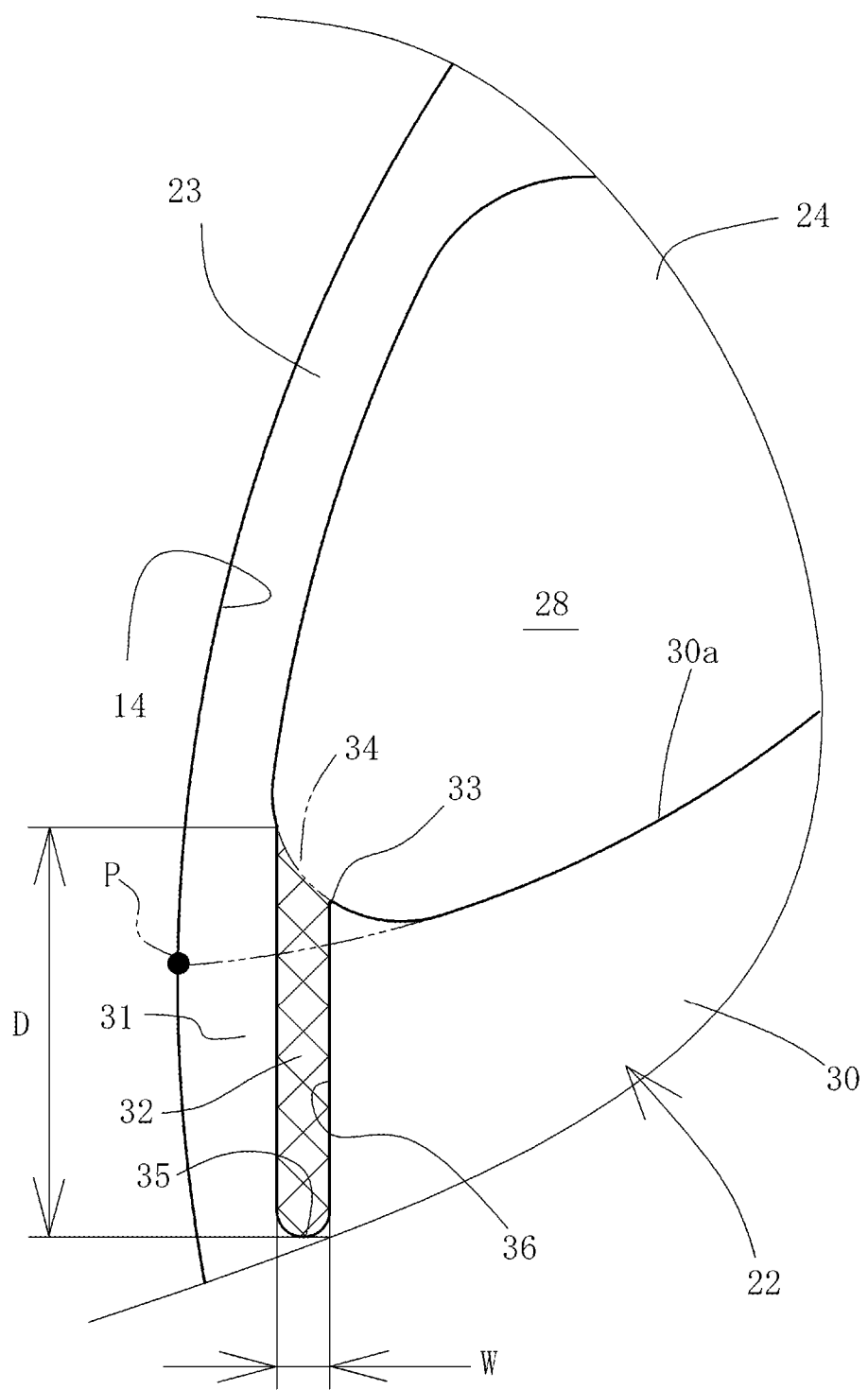
FIG. 5 is an enlarged view of an essential part of FIG. 3.

As shown in FIG. 5 which indicates a part of the spring adjustment recess 32 of FIG. 3 in an enlarged scale, a part shown by a phantom line extending the front edge portion 30a of the elastic arm section 30 from the bending portion 33 toward the second ring-shaped member 14 is an opening portion 34 corresponding to a portion formed by cutting a part of the front end portion 30a by the spring adjustment recess 32. The opening portion 34 opens the spring adjustment recess 32 forwardly toward the first bore section 24. The spring adjustment recess 32 passes through in the Z direction and is formed with the opening portion 34 which is open to the enlarged opening 28.

Further, in a plan view of the second insulator 22, the spring adjustment recess 32 is formed in a condition where the joint portion 31 of the elastic arm section 30 is cut in a slit shape backwardly in parallel with the X direction from the front edge portion facing the enlarged opening 28 of the first bore section 24. A rear end portion 35 of the spring adjustment recess 32 extends into the thickness in the direction of the X axis of the elastic arm section 30 and is located on the lateral side of the second inner member 20.

A part of the elastic arm section 30 located in the inward position of the spring adjustment recess 32 (on the side of the second inner member 20) and in the vicinity of the spring adjustment recess 32 is an unrestricted region 36 which is not restricted by the second ring member 14.

Herein, the length from the opening portion 34 to the rear end portion 35 is the depth (depth of cut) D of the spring adjustment recess 32, and the width of the slit of the spring adjustment recess 32 is designated W.

The spring adjustment recess 32 is involved mainly in the adjustment of the Z spring. Since a portion of the elastic arm section 30 is not restricted by the second ring-shaped member 14 due to the spring adjustment recess 32, the Z spring Ez is greatly decreased. Therefore, the depth D is properly determined in such a manner that the predetermined XZ spring ratio Ez/Ex is obtained, as referred to later.

On the other hand, the influence of the width W of the slit is very small. When the spring adjustment recess 32 is offset from the region 38 to the outward side in the Y direction, there is little influence upon the X spring. Also, the Y spring is not influenced too much unless the width W of the slit is increased large.

Accordingly, the spring adjustment recess 32 is properly determined mainly in consideration of a position to be provided and the depth D. In the case where the spring adjustment recess 32 is provided, it is essential that the spring adjustment recess 32 as an unrestricted portion by the second ring-shaped member 14 is formed in a part of the second insulator 22.

In other words, the spring adjustment recess 32 is formed such that the rear end portion 35 of the recess extends to and is located in a more backward position than an intersection point P (a point shown by a phantom line) of the front edge portion 30a with the second ring-shaped member 14, when the front edge portion 30a is extended in the direction of the second ring-shaped member 14.

Figure 6:
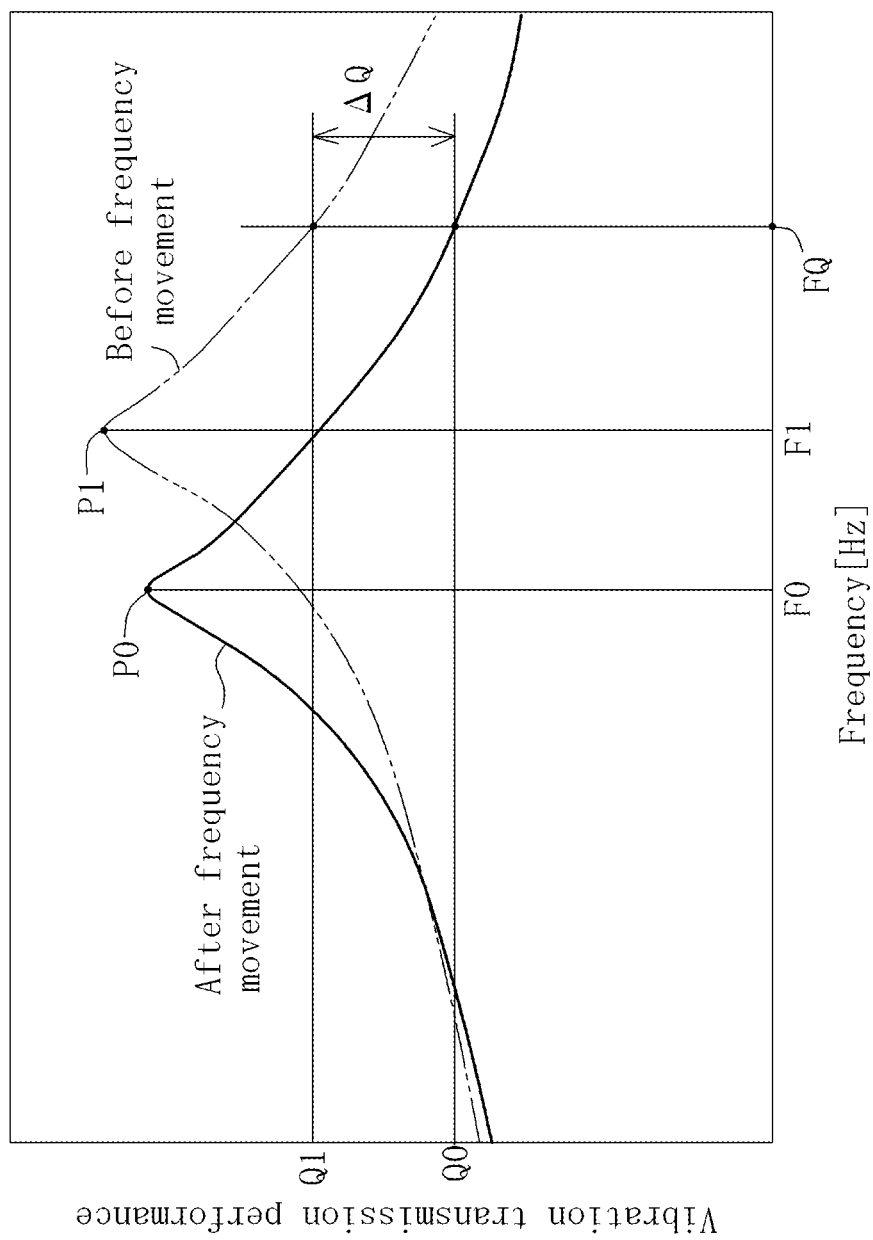
FIG. 6 is a graph indicating a relationship between a resonance frequency and vibration transmission performance.

FIG. 6 indicates the vibration transmission characteristic before frequency movement (prior art) and the vibration transmission characteristic after the frequency movement (present invention). In the vibration transmission characteristic after the frequency movement (present invention), since the Z spring is decreased due to the existence of the spring adjustment recess 32, a peak of the characteristic curve becomes P0, and the frequency of the rigid body resonance is changed to F0, whereby the characteristic curve as a whole is shifted to the left side of the drawing substantially in parallel.

Figure 7:
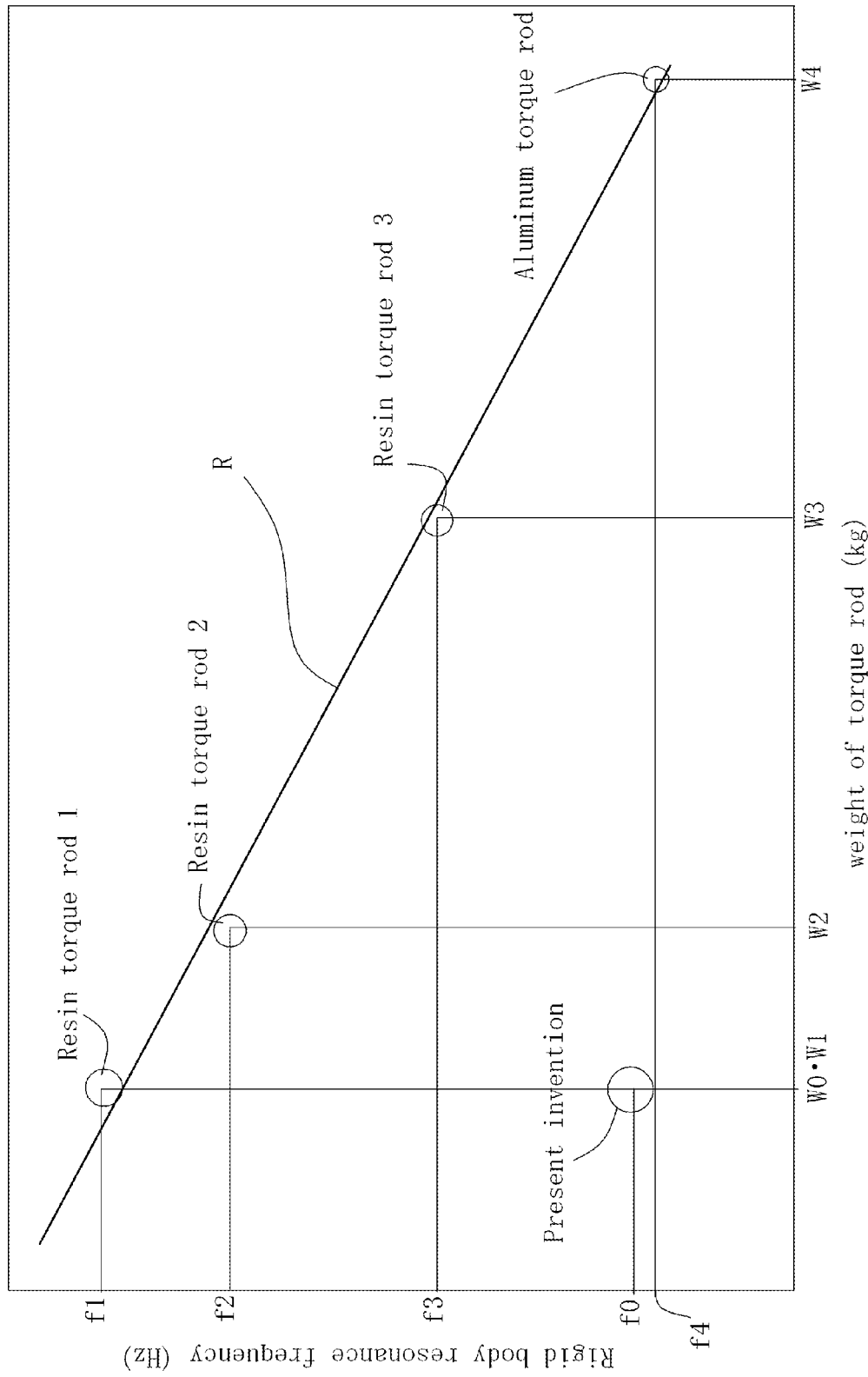
FIG. 7 is a graph indicating a relationship between weight of the torque rod and a rigid body resonance frequency.

FIG. 7 is a graph indicating a relationship between weight of the torque rod and a rigid body resonance frequency, wherein a vertical axis is the rigid body resonance frequency and the horizontal axis is the weight (a square root) of the torque rod.

The rigid body resonance frequency of the torque rod is subject to the influence of the weight. As the weight is increased, the rigid body resonance frequency is lowered along a steadily declining characteristic straight line R.

Then, torque rods 1, 2 and 3 made of resin and a torque rod made of an aluminum alloy are prepared as samples. When weights of these torque rods are W1~W4 (W1<W2<W3<W4), the rigid body resonance frequencies come to f1>f2>f3>f4.

Accordingly, in order that the weight of the torque rod is adjusted for allowing the rigid body resonance frequency to come to f0 similar to the frequency F0 at which the vibration isolating effect is caused as seen in FIG. 6, the weight is required to be the weight W4 (the frequency f4) as with the aluminum alloy torque rod.

On the other hand, since the torque rod of the present invention is resinified, it has substantially the same weight W0 as the weight W1 of the resin torque rod 1. Moreover, since the Z spring is reduced due to the provision of the spring adjustment recess 32, the rigid body resonance frequency of the torque rod of the present invention comes to the frequency f0 of the rigid body resonance realized by the heaviest aluminum alloy torque rod.

Figure 8:
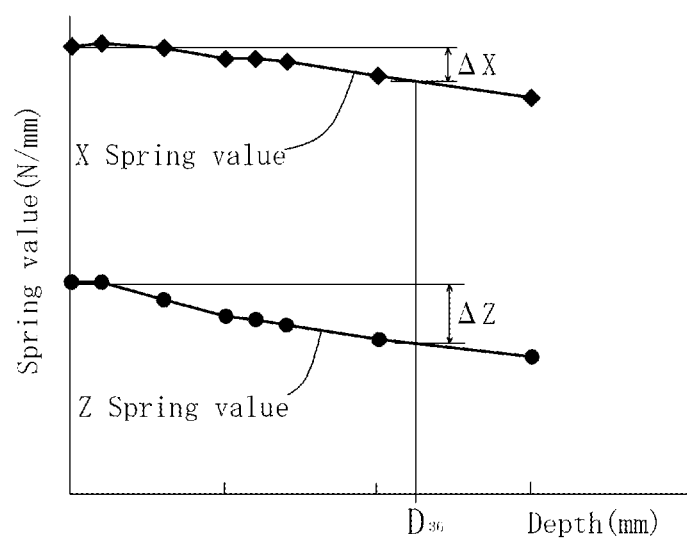
FIG. 8 is a graph indicating a relationship between a depth of a spring adjustment recess and a spring value.

FIG. 8 indicates a relationship between the depth D of the spring adjustment recess 32 and each spring value in the X direction and in the Z direction, wherein the horizontal axis is the depth D and the vertical axis is the spring value. In addition, FIG. 9 is a graph indicating a relationship between the depth D and the Z spring, wherein the horizontal axis is the depth D, the left vertical axis is the XZ spring ratio (Ez/Ex) and the right vertical axis is the spring value Ez of the Z spring.

As shown in FIG. 8, as the depth D of the spring adjustment recess 32 is increased, both the spring values of the X spring and the Z spring are decreased. However, the decrease is slow and substantially leveling off.

However, the decreasing ratios of the spring values to the depths are different. The decreasing ratio is greater in the Z spring. For example, in the case where the depth is D36 (the depth when the XZ spring ratio is 0.36, to be referred to later), the decreasing ratio ΔX is about 10%, and the decreasing ratio ΔZ of the Z spring is about 30%. The difference between these decreasing ratios expands with the increase in the depth D.

Figure 9:
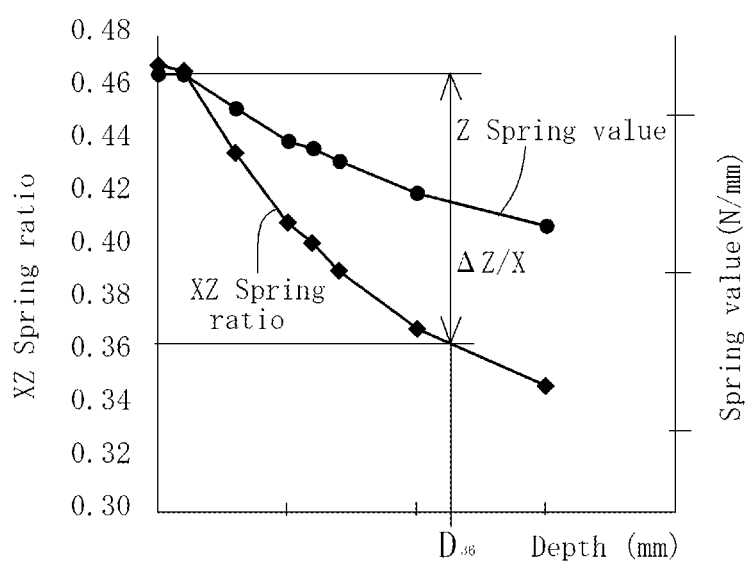
FIG. 9 is a graph indicating a relationship between the depth of the spring adjustment recess and an XZ spring ratio.

Therefore, as indicated in FIG. 9, the XZ spring ratio Ez/Ex gradually decreases with the increase in the depth D.

Accordingly, a remarkable XZ spring ratio is able to be formed by the determination of the depth D. For example, in the case where the XZ spring ratio Ez/Ex is to be 0.36, in the FIG. 9, the depth is D36 (for example, about 12 mm). At that time, the X spring has its decreasing ratio ΔX of about 10% (FIG. 8), so that the spring value sufficient for practical use can be maintained. Namely, the small XZ spring ratio Ez/Ex can be obtained while maintaining the spring value Ex of the X spring at a sufficient value. In this embodiment, the spring value sufficient for the practical use can be maintained until the XZ spring ratio becomes 0.35. In other words, it is possible to decrease the XZ spring ratio to about 0.35.

By the way, although the Z spring can be decreased with decrease in the XZ spring ratio, there is a limit, in the past, to what the XZ spring ratio is decreased below a predetermined value (for example, about 0.46 as seen in FIG. 9) without decreasing the X spring. However, as indicated in FIG. 8, since the Z spring can be decreased without decreasing the X spring much and in a state of maintaining the X spring in a range of the practical use, it becomes possible to decrease the XZ spring ratio to about 0.35, for example, without exerting the much influence upon the X spring.

Further, the spring adjustment recess 32 is formed by cutting deep the elastic arm section 30 in such a manner to extend from the enlarged opening 28 in the direction of the X axis. Therefore, due to this spring adjustment recess 32, the unrestricted portion provided so as not to be restricted by the second ring-shaped member 14 can be easily formed in a portion of the end in the radial direction of the elastic arm section 30 joined to the second ring-shaped member 14.

In addition, since the spring adjustment recess 32 is formed in the shape of a slit having the small opening width W so as to reduce the influence upon the X spring and the Y spring, the Z spring only can be decreased large without decreasing the X spring which is essential for the practical use, while maintaining the necessary spring value and maintaining the Y spring at the predetermined size.

Moreover, since the opening width W of the spring adjustment recess 32 is able to be reduced to an extremely small size, there are a little restrictions on the location of the formation of the recess, and the formation thereof can be easily performed.

Figure 10:
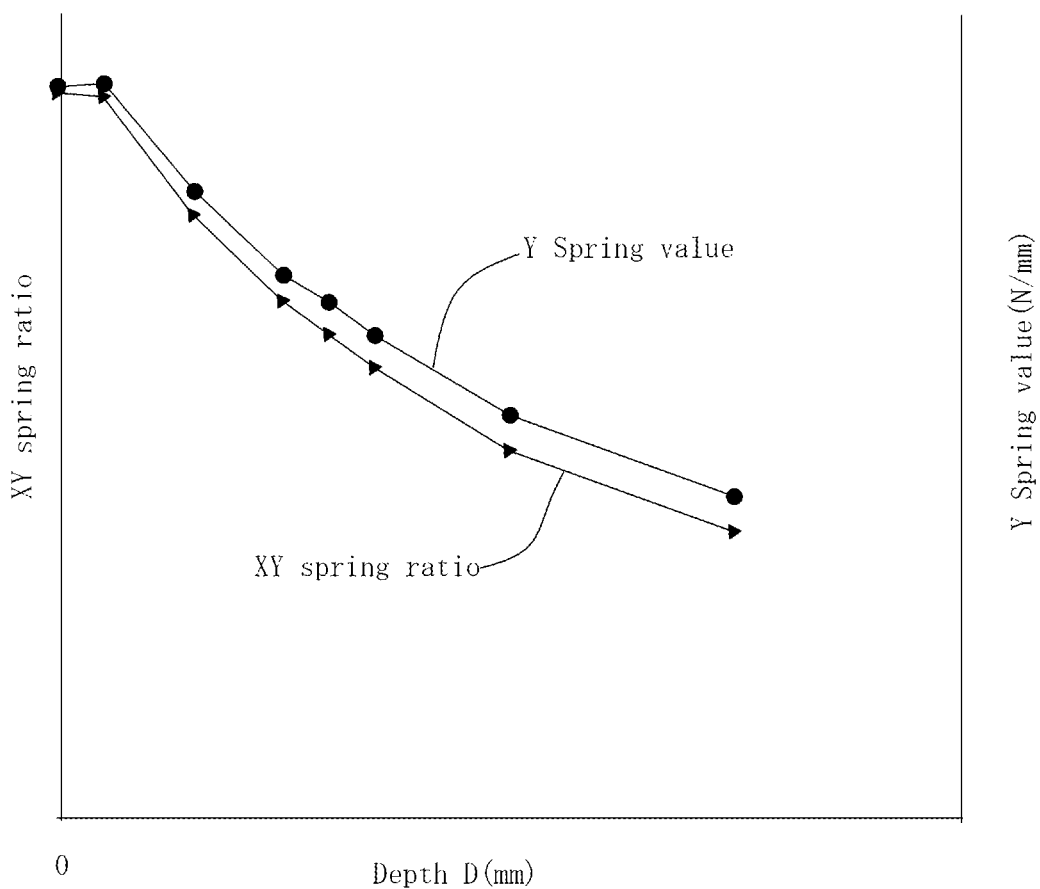
FIG. 10 is a graph indicating a relationship between the depth of the spring adjustment recess and a Y spring.

FIG. 10 is a graph indicating a relationship between the depth D of the spring adjustment recess 32 and each of the Y spring and an XY spring ratio, wherein the horizontal axis is the depth D, the left vertical axis is the XY spring ratio (Ey/Ex), and the right vertical axis is the spring value Ey of the Y spring.

As indicated in this drawing, although the Y spring is gradually decreased as the depth D of the spring adjustment recess 32 is increased, the X spring is slowly lowered and is not changed much, as described above. Therefore, the change of the XY spring ratio is substantially the same as the change of the Y spring.

This means that the influence due to the depth D of the spring adjustment recess 32 is exerted upon the X spring and the Y spring to the same degree, and that the XY spring ratio is not changed as much as the XZ spring ratio. In addition, this means that the adjustment of the spring ratio is able to be performed by the depth D of the spring adjustment recess 32 in such a manner that the XZ spring ratio is changed greater than the XY spring ratio.

Figure 11:
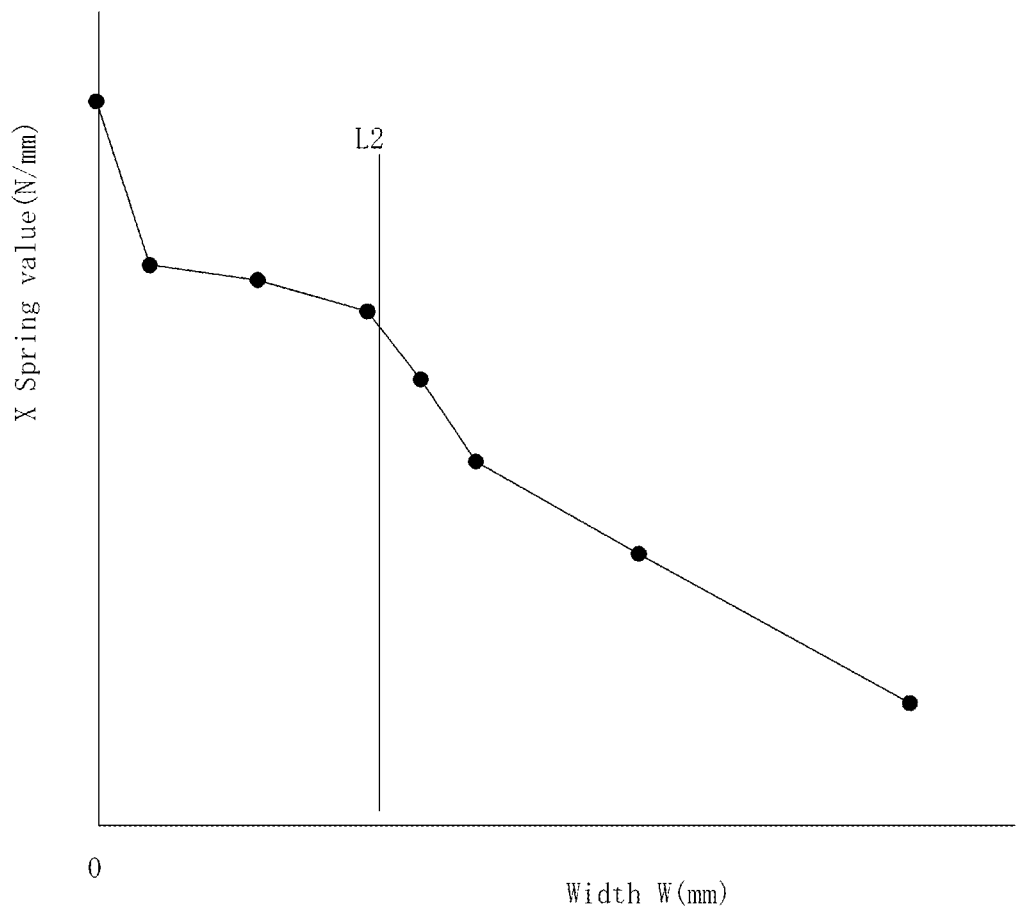
FIG. 11 is a graph indicating a relationship between a width of the spring adjustment recess and an X spring.

FIG. 11 is a graph indicating a relationship between the width W of the spring adjustment recess 32 and the X spring, wherein the horizontal axis is the width W, and the vertical axis is the value of the X spring. The X spring is gradually lowered with the increase in the width W of the spring adjustment recess 32. Then, in FIG. 3, the width W of the spring adjustment recess 32 is changed in such a way as to be widened in the direction of the second inner member 20. At that time, when exceeding the line L2 which passes through the end in the left and right direction of the second bore section 26, the X spring is rapidly lowered as seen in FIG. 11. Accordingly, it is to be understood that the spring adjustment recess 32 has to be located outwardly of the line L2 so as not to lower the X spring too much.

By the way, when adjusting the depth D and the width W of the spring adjustment recess, it is possible to freely adjust the spring ratios in the three axial directions of XYZ, especially, the XY spring ratio and the XZ spring ratio.

Next, the operation of the embodiment will be explained. A shown in FIG. 5, since the spring adjustment recess 32 in the shape of a groove is provided in the joining portion to the second ring-shaped member 14 whereby to form the unrestricted portion not to be restricted by the second ring-shaped member 14, the Z spring can be decreased greatly.

The adjustment of the spring ratio by the depth of the spring adjustment recess 32 will be explained hereunder. In FIG. 9, the depth is configured to be D36 (for example, about 12 mm). At that time, the decreasing ratio ΔX of the X spring is about 10% (FIG. 8), so that the X spring is able to maintain the spring value sufficient for the practical use. Namely, it is possible to provide the small XZ spring ratio Ez/Ex while maintaining the spring value Ex of the X spring at the sufficient value. In this embodiment, the spring value sufficient for the practical use can be maintained until the XZ spring ratio comes to 0.35. In other words, it is possible to decrease the XZ spring ratio to about 0.35.

In the case of the prior art, the XZ spring ratio is the ratio of each spring value of the X spring and the Z spring in the case where the depth D in FIG. 8 is 0. A seen in FIG. 9, Ez/Ex is about 0.46. The limits of this numerical value are about 1:0.45~0.46 at the very most, even if the numerical value is adjusted in all sorts of ways by changing the configuration or the like of the elastic arm section 30.

According to the present invention, however, it is possible to lower it to about 1:0.35~0.36 without exerting much influence upon the X spring as the vibration isolating main body. As a result, the greatly small XZ spring ratio which has not been realized in the past can be provided, whereby the width of control has been widened.

In FIG. 9, the difference A (Z/X) of the spring ratio at the depth D36 to the XZ spring ratio at the depth D0 (corresponding to the prior art) is about 0.1. It is apparent that, by the width of this difference A (Z/X), the XZ spring ratio is being controlled in such a way as to be decreased greatly.

Moreover, by merely adding such a simple construction that the relatively small spring adjustment recess 32 is provided and the depth D thereof is adjusted, the XZ spring ratio is able to be set freely at 0.45 or less which has not been able to be realized in the past.

Namely, generally, when the Z spring is decreased, the X spring forming the vibration isolating main body also has a tendency to be lowered. Therefore, it is difficult to decrease only the X spring while maintaining the X spring at the predetermined value or above it. Accordingly, although it is desired that only the Z spring is decreased more without having much influence upon the X spring, this can be resolved.

Further, this means that, in the XZ spring ratio (the Z spring/the X spring) indicating the relationship between the X spring and the Z spring, when the X spring is constant, the Z spring can be decreased with the decrease in the XZ spring ratio. However, although there is a limit to what the XZ spring ratio is decreased below the predetermined value for the same reason as that why to decrease the Z spring only is difficult as described above, it has become possible to decrease the XZ spring ratio more.

Like this, the resonance frequency in the Z direction of the rigid body resonance of the torque rod can be reduced by decreasing the Z spring while decreasing the XZ spring ratio.

As a result, as seen in FIG. 6, the characteristic curve indicating the vibration transmission characteristic of the torque rod is shifted substantially in parallel from that before the frequency movement (the prior art) having the peak P1 to that after the frequency movement having the peak P0, whereby the frequency of the rigid body resonance is lowered from F1 to F0.

Therefore, the vibration transmission performance of the highly sensitive frequency FQ on the vehicle body side is lowered from Q1 to Q0, whereby the vibration transmitted to the vehicle body side can be suppressed and the sufficient vibration isolating effect ΔQ can be obtained.

Namely, through the adjustment of the XZ spring ratio, the rigid body resonance frequency of the torque rod created by the vibration in the Z direction can be controlled. In the case of adjusting the frequency of the rigid body resonance by the spring, particularly, the vibration to be isolated is the vibration inputted in the direction of the vehicle body mounting shaft (the Z direction). Therefore, if the spring of the insulator in this direction, namely, the Z spring is decreased, the resonance frequency of the rigid body resonance inputted in the Z direction is lowered, so that the vibration transmission to the vehicle body side can be suppressed. As a result, the vibration transmission characteristic to the vehicle body side is lowered whereby to make it possible to suppress the vibration transmission.

In addition, since the control width of the XZ spring ratio is expanded, the degree of freedom in tuning can be improved.

Moreover, the adjustment of the XZ spring ratio is able to be performed by changing the width W of the spring adjustment recess 32. Due to the adjustment of the XZ spring as above, the resonance frequency in the Z direction of the rigid body resonance of the torque rod becomes possible to be controlled relatively freely. At the same time, the adjustment of the spring ratios in the three axial directions of XYZ becomes possible due to the spring adjustment recess 32.

In addition, the decrease in the Z spring can be performed while reducing the weight of the torque rod. As seen in FIG. 7, since the torque rod of the present invention is resinified, it has substantially the same weight W0 as the weight W1 of the resin torque rod 1. Moreover, since the Z spring is reduced due to the provision of the spring adjustment recess 32, the rigid body resonance frequency of the torque rod comes to the frequency f0 of the rigid body resonance realized by the heaviest aluminum alloy torque rod.

Further, since, in order to reduce the weight of the vehicle body, the torque rod also is required to reduce its weight as much as possible, the resin torque rod is adopted so as to reduce the weight greater than the metal torque rod such as the aluminum alloy torque rod (the weight W4) or the like. However, all the resin torque rods 1~3 have the rigid body resonance frequencies f1~f3 which are higher than the frequency f0 to be aimed at. Accordingly, the weight reduction of the torque rod and the decrease of the rigid body resonance frequency have been incompatible with each other.

In the present invention, however, since the torque rod is resinified and the Z spring is decreased by the spring adjustment recess 32, the weight reduction of the torque rod is made compatible with the decrease of the rigid body resonance frequency, whereby the requirement of the weight reduction in the vehicle body also can be accomplished. In addition, due to the resinification, the torque rod can be reduced in weight as much as possible.

By the way, since the decrease in the Z spring is performed by provision of the spring adjustment recess 32 in the joint portion 31 of the elastic arm section 30, there is no increase in weight and it is possible to reduce the weight by the spring adjustment recess 32. Therefore, the decrease in the rigid body resonance frequency can be accomplished without increase in weight of the torque rod, regardless of whether or not the torque rod is resinified.

Moreover, in order for the weight reduction, the resinification is not necessarily required, and it is possible to make use of a proper nonmetal material having a lower specific gravity which is lower than 2.7 of the specific gravity of aluminum.

Figure 12:
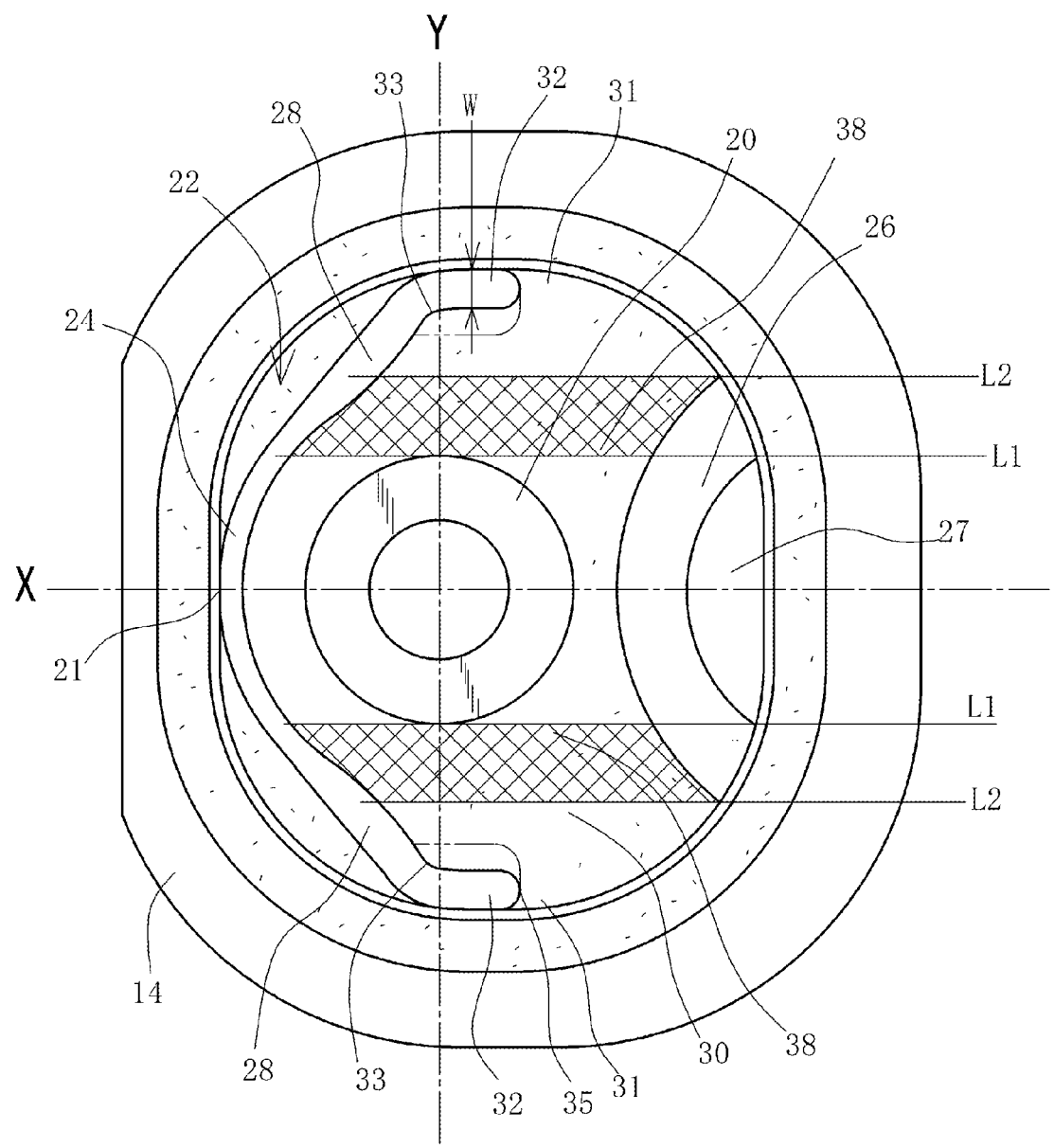
FIG. 12 is a view of a part similar to FIG. 3 in accordance with another embodiment.

FIG. 12 is a view of a part similar to FIG. 3 in accordance with another embodiment, in which an opening width W of the spring adjustment recess 32 is enlarged. Herein, like elements are given like reference characters with respect to the construction corresponding to the previously described embodiment and the explanation will not be repeated.

The spring adjustment recess 32 of this embodiment is formed as a recessed groove having the same opening width W as the enlarged opening 28, and extends long in such a manner that a rear end thereof extends up to the location in the vicinity of the rear end portion of the second inner member 20. However, also in this embodiment, the spring adjustment recess 32 is provided in the outward position of the region 38.

With this construction, in the similar way to the previous embodiment, although the Y spring is decreased a little, the Z spring can be lowered greatly while maintaining the X spring at the predetermined value.

By the way, the size of the opening width W, as shown by a phantom line in the drawing, is freely adjustable in accordance with desired sizes of the Y spring under conditions where the spring adjustment recess 32 is located outwardly of the region 38 (on the side of the second ring-shaped member 14).

Figure 13:
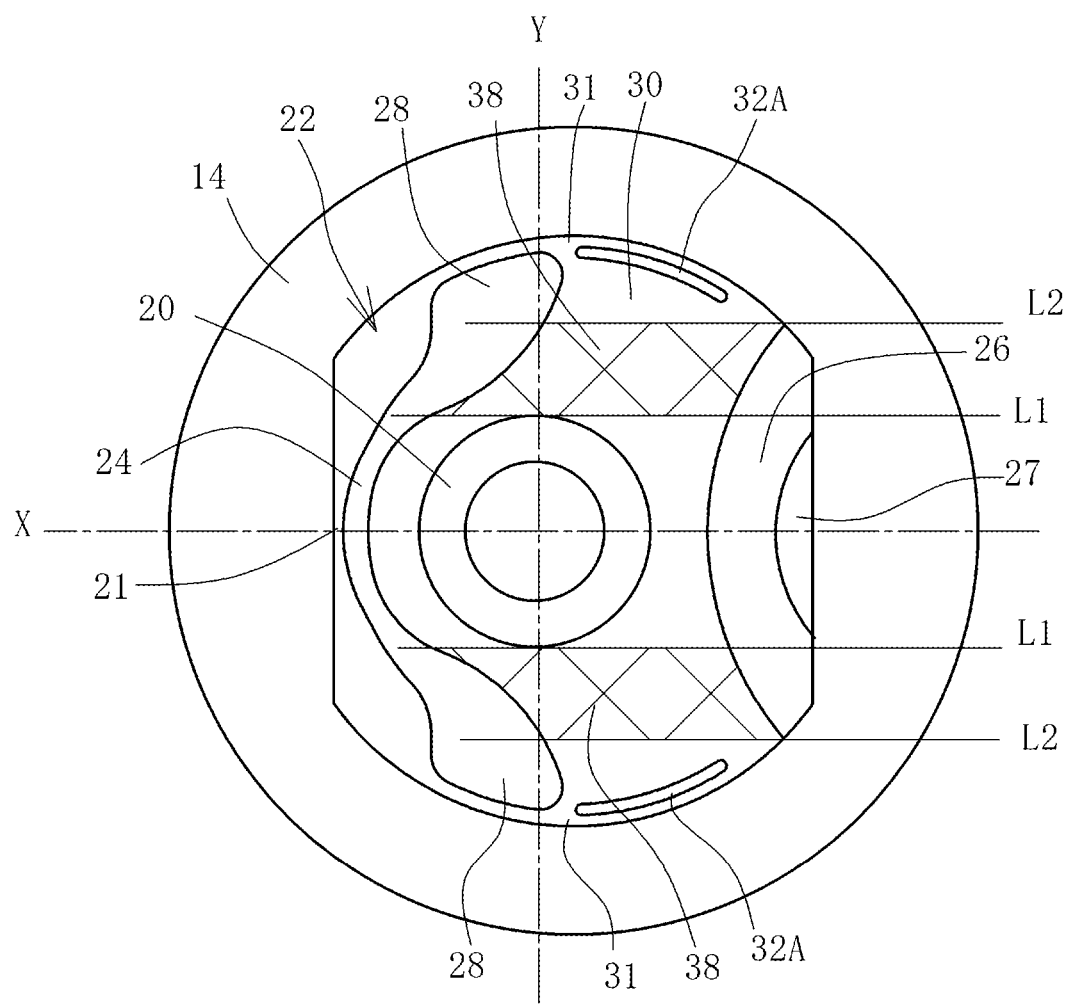
FIG. 13 is a view of a part similar to FIG. 3 in accordance with still another embodiment.

By the way, the present invention is not limited to the above embodiments, and various changes and modifications may be made in the invention without departing from the spirit and scope thereof. For example, as the spring adjustment recess, as shown in FIG. 13, a spring adjustment recess 32A may be formed in the shape of a through bore in an intermediate position of the joint portion 31 of the elastic arm section 30. The spring adjustment recess 32A in this case, in the similar way to the previous embodiments, is located on the outward position in the Y direction of the region 38 and is offset from the spring region 38 functioning as the main body of the spring action at the time of inputting the main vibration. In addition, the width and the length of the spring adjustment recess 32A may be freely determined in accordance with the specification.

Further, also with respect to the small round section 11*a* on the small size side as shown in FIGS. 1 and 2, the elastic arm section 30 and the spring adjustment recess 32 similar to the large round section 11*b* on the large size side may be provided.

What is claimed is:
1. A torque rod comprising:
a rod main body of a long member,
a small round section and a large round section which form a pair of vibration isolating connecting sections different in size, being provided in each end in the longitudinal direction of the rod main body,
at least the large round section of the vibration isolating connecting sections including a ring-shaped member provided in the rod main body, an inner member arranged in a center portion of the ring-shaped member, and an insulator of an elastic body elastically connecting the inner member and the ring-shaped member,
wherein, a center axis of the inner member is a Z axis, a main vibration inputting axis orthogonal to the Z axis is an X axis, and an axis orthogonal to these Z axis and X axis is a Y axis,
wherein the insulator extends from the inner member to both sides of the X axis and includes
an elastic arm section, each extending end of which is joined to, and restricted in the Y axis by the ring-shaped member, and
a spring adjustment recess provided in a part of a joint portion of the elastic arm section relative to the ring-shaped member, and separating a part of the elastic arm section from the ring-shaped member so as to provide an unrestricted region on the elastic arm section that is separated from and not restricted by the ring-shaped member, and
wherein the insulator has a spring value of Ex in the X axis, a spring value of Ey in the Y axis, and a spring value of Ez in the Z axis, all of which are affected by the depth and width of the spring adjustment recess, wherein the insulator has a XZ spring ratio of Ez/Ex, which may be reduced by including the spring adjustment recess in comparison to not including the spring adjustment recess, in order to adjust a frequency of the rigid body resonance in the direction of the Z axis in such a way as to be offset from the high sensitive frequency on a vehicle body side.

2. The torque rod according to claim 1, wherein the spring adjustment recess is located in an outward position in the direction of the Y axis in relation to a spring region of the elastic arm section, the spring region functioning as a main body of spring action when a main vibration has been inputted.

3. The torque rod according to claim 1, wherein the insulator includes a first bore section and a second bore section which are located in either side of the inner member in the direction of the X axis, wherein the first bore section and the second bore section pass through the insulator in the direction of the Z axis and extend on either side of the X axis across the elastic arm section, and the spring adjustment recess is formed in such a way as to extend from the first bore section or the second bore section in the direction of the X axis.

4. The torque rod according to claim 3,
wherein, when a tangential line of the inner member in parallel with the X axis is L1 and a straight line extending in parallel with the tangential line and passing an end portion of the second bore section in the direction of the Y axis and a connecting section with the ring-shaped member is L2, a region of the elastic arm section located between the tangential line L1 and the straight line L2 is the spring region, which functions as the main body of the spring action when a main vibration has been inputted, and wherein the spring adjustment recess is provided in an outward position of the spring region in the direction of the Y axis.

5. The torque rod according to claim 1, wherein the spring adjustment recess is formed in a slit shape.

6. The torque rod according to claim 1, wherein the rod main body and the ring-shaped member are integrally formed of non-metal having a specific gravity of 2.7 or less.

7. The torque rod according to claim 2, wherein the insulator includes a first bore section and a second bore section which are located in either side of the inner member in the direction of the X axis, wherein the first bore section and the second bore section pass through the insulator in the direction of the Z axis and extend on either side of the X axis across the elastic arm section, and the spring adjustment recess is formed in such a way as to extend from the first bore section or the second bore section in the direction of the X axis.

8. The torque rod according to claim 7, wherein, when a tangential line of the inner member in parallel with the X axis is L1 and a straight line extending in parallel with the tangential line and passing an end portion of the second bore section in the direction of the Y axis and a connecting section with the ring-shaped member is L2, the spring region of the elastic arm section is located between the tangential line L1 and the straight line L2.

9. The torque rod according to claim 1, wherein the spring adjustment recess is formed of a groove.

10. The torque rod according to claim 1, wherein the spring adjustment recess is formed in the shape of a through bore in an intermediate position of the joint portion of the elastic arm section.

11. The torque rod according to claim 1, wherein the XZ spring ratio of Ez/Ex is 0.35 to 0.36.

* * * * *